UNITED STATES PATENT OFFICE.

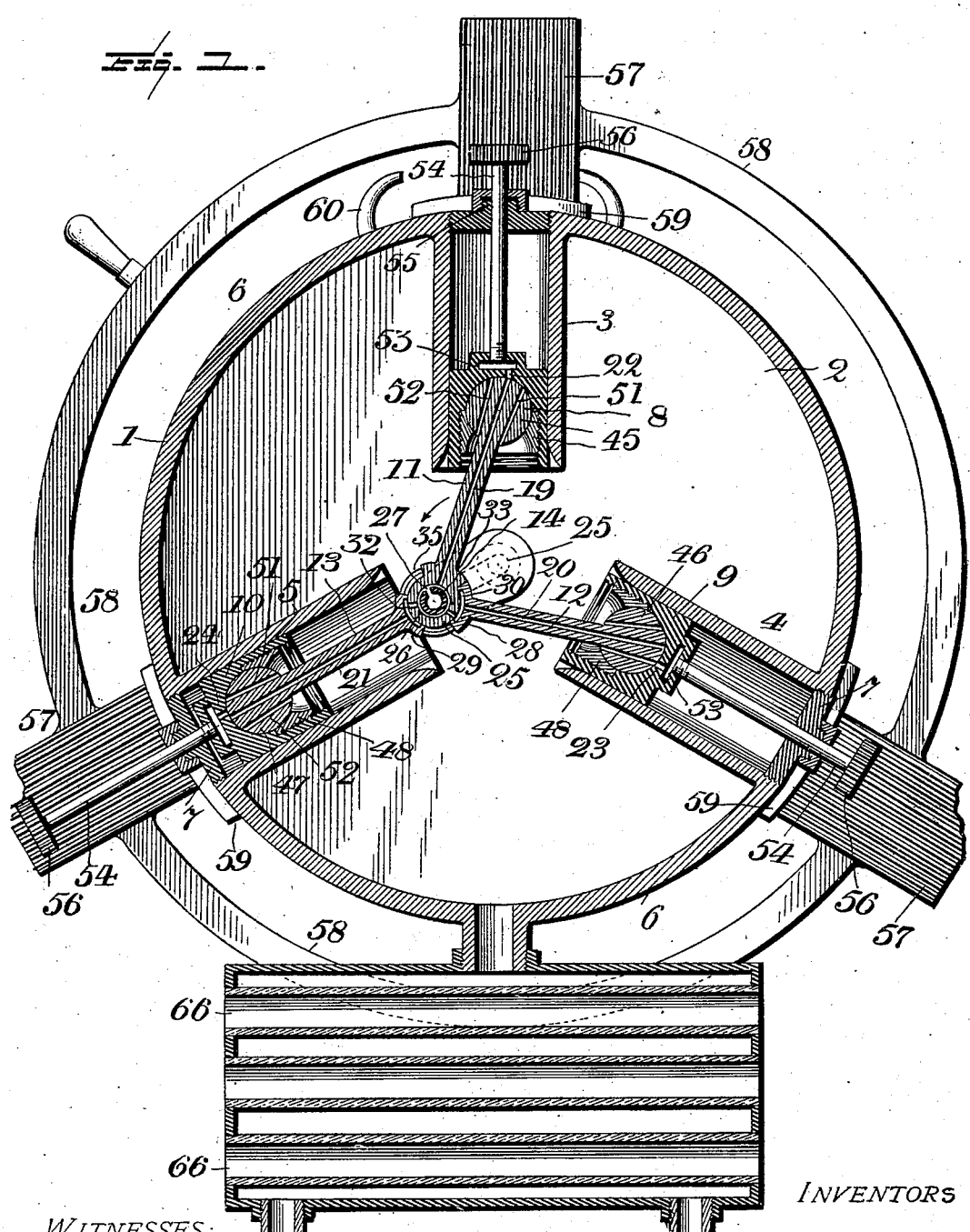

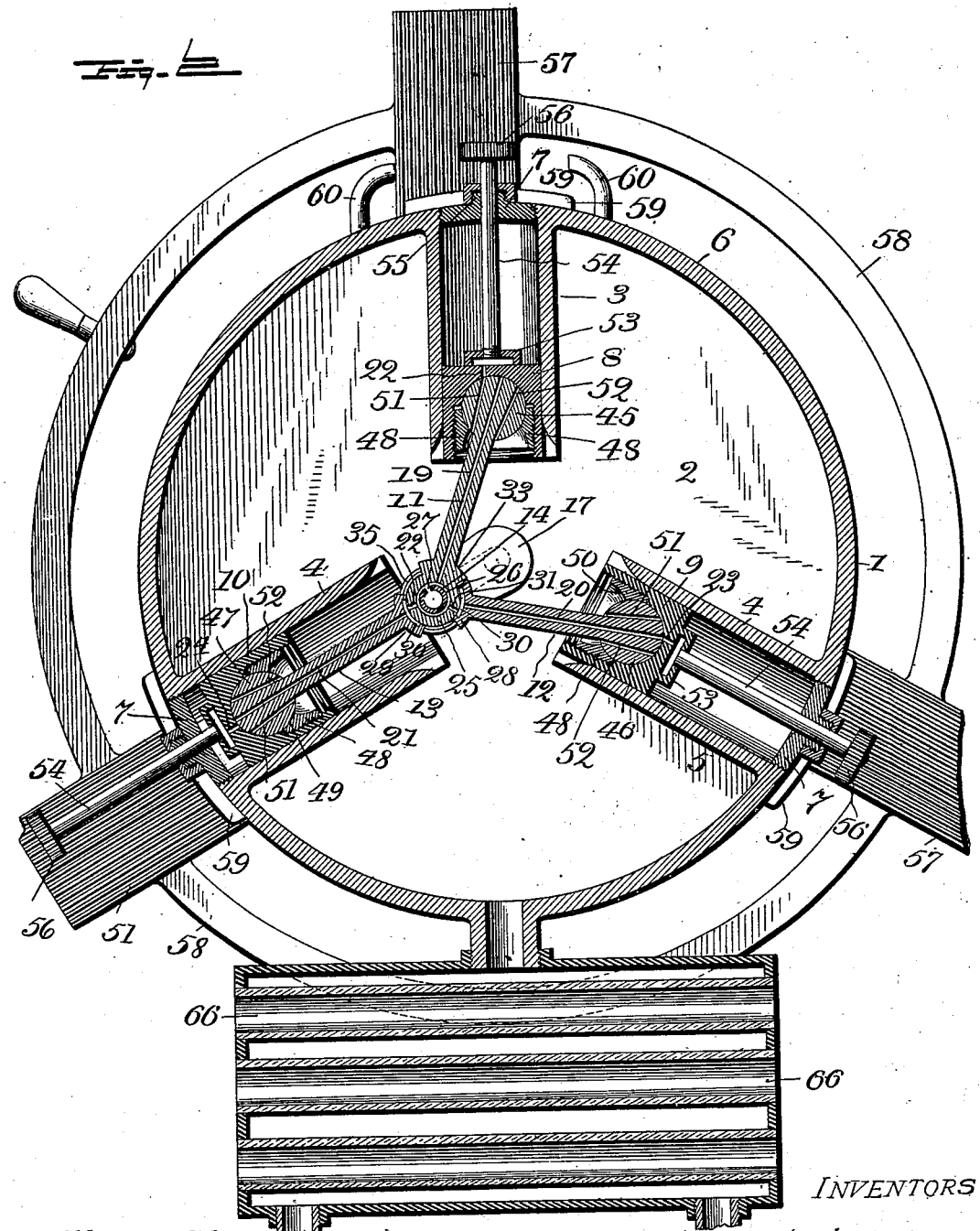

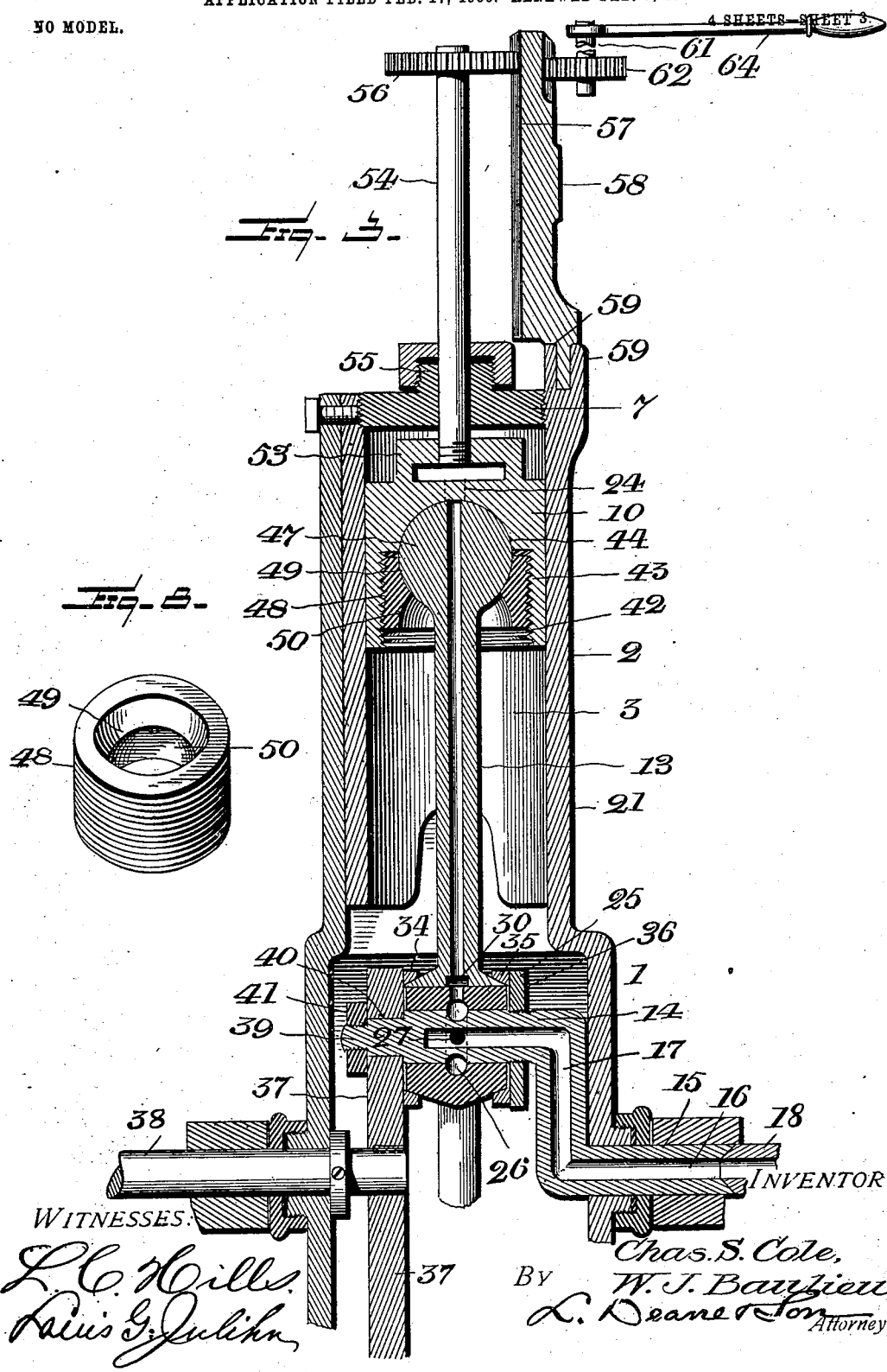

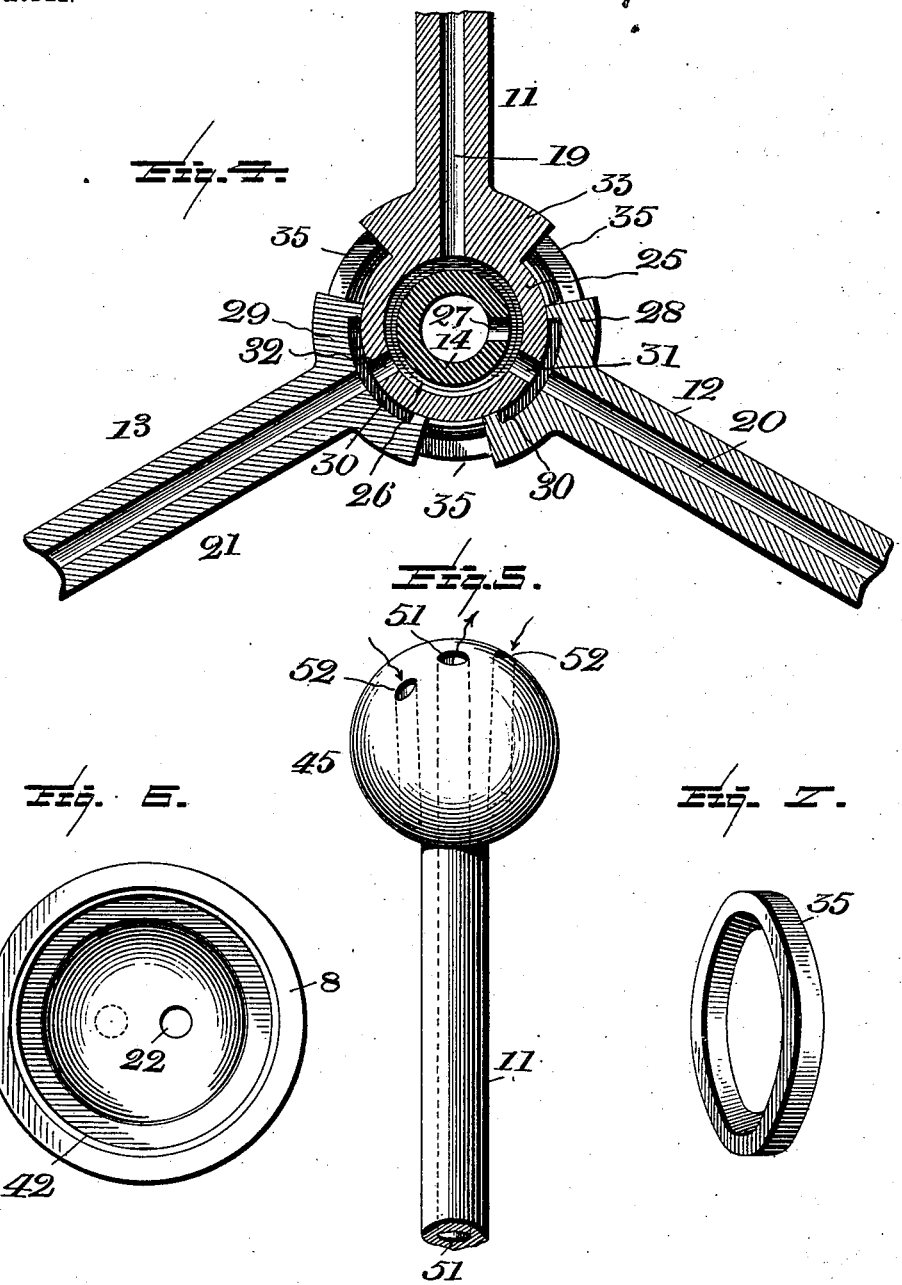

CHARLES S. COLE AND WILLIAM J. BAULIEU, OF BRIDGEPORT, CONNECTICUT; SAID BAULIEU ASSIGNOR TO SAID COLE.

MOTOR FOR AUTOMOBILES, &c.

SPECIFICATION forming part of Letters Patent No. 724,379, dated March 31, 1903.

Application filed February 17, 1900. Renewed February 9, 1903. Serial No. 142,606. (No model.)

*To all whom it may concern:*

Be it known that we, CHARLES S. COLE and WILLIAM J. BAULIEU, citizens of the United States, residing at Bridgeport, in the county of Fairfield and State of Connecticut, have invented certain new and useful Improvements in Motors for Automobiles, &c.; and we do hereby declare the following to be a full, clear, and exact description of the invention, such as will enable others skilled in the art to which it appertains to make and use the same.

Our present invention relates to improvements in motors, and particularly to novel reversing-gear for multiple-cylinder engines.

The object of the invention is to produce a motor designed with special reference to its availability as a generator of power for the propulsion of light vehicles comprehended by the popular acceptation of the term "automobile" and other forms of automobelia—such, for instance, as bicycles, launches, &c. The primary considerations governing the utility of motors for use in these connections are economy of space and consumption of motive fluid, maximum generative power, extreme simplicity of construction, smooth antifrictional and non-vibratory operation, and, above all, such special provision for the obvious manipulation of the controlling mechanism as will render the motor capable of being handled effectively by an unskilled operator.

Our invention consists, therefore, in a novel construction necessitating the smallest possible number of operative parts arranged in a compact organization involving few wearing-surfaces and embodying a novel, simple, and ingenious arrangement of valves and of valve-gearing by means of which the valves of each cylinder may be reversed at any point of the piston-stroke to cause the engine to run in either direction without producing the destructive jar or strain usually incident to the sudden reversal of the engine.

Referring to the accompanying drawings, Figure 1 is an elevation of our engine with one of the casing-heads removed. Fig. 2 is a similar view with the pistons reversed. Fig. 3 is a central vertical sectional view on the line 3' 3' of Fig. 1. Fig. 4 is a detailed section of the wrist and the inner ends of the piston-rods. Fig. 5 is a detail view of the valve-head of one piston-rod. Fig. 6 is a detail view of the inner face of a piston. Fig. 7 is a detail perspective view of one of the clamping-rings. Fig. 8 is a similar view of one of the bearing-rings.

Referring to the numerals of reference employed to designate corresponding structural features and elements in the several views, 1 indicates the casing of our engine which is of that type designated in the art as "multiple-cylinder" engines. The casing is preferably cylindrical or formed with one integral or fixed head 2 and cast with a plurality of internal radial cylinders—say three in number, (designated by the numerals 3, 4, and 5)—extending inwardly from the circular wall 6, through which each cylinder opens. The outer ends of the cylinders are closed by threaded heads 7, and within each cylinder is designed to reciprocate a reversible piston 8, 9, or 10, which are reciprocated successively under steam-pressure to actuate oscillating reciprocatory piston-rods 11, 12, and 13, connected to the pistons in a manner to be described and having a common connection at their inner ends with the wrist 14 of a power-shaft 15. One end 16 of the shaft is hollow, as is also the contiguous crank-bar 17 and the wrist 14. Steam is led into this hollow end from the steam-supply pipe 18, and it passes thence through the hollow bar 17 to the interior of wrist, from which it passes to the supply-ports or longitudinal bores 19, 20, and 21 of the hollow piston-rod, finally escaping to the interiors of the cylinders through the eccentric piston-ports 22, 23, and 24, piercing the pistons longitudinally.

Before proceeding further with the description of the details of construction it must be noted that the piston-rods are not rigidly connected to the pistons, but are permitted to osciliate sufficiently to permit their lower ends to follow the circular path of movement of the wrist as the power-shaft is rotated under the impulse of the rods and pistons subjected successively to steam-pressure by the successive admission of steam to the several cylinders.

As we have seen, the steam is supplied to the cylinders through the wrist and rods, and it therefore follows that provision must be made for maintaining the communication between the interiors of said elements during the revolutions of the wrist and the oscillations of the rods. This feature of the motor is shown clearly in Fig. 3 of the drawings, and as a description thereof is necessary to an intelligent understanding of the motor as a whole we will now proceed with the explanation of its construction and operation, although specifically it constitutes no part of the present invention and is described and claimed in a concurrent application for Letters Patent filed February 17, 1900, Serial No. 5,586.

One of the piston-rods—for instance, the rod 11—is formed at its inner end with a transverse terminal sleeve 25, fitting closely upon the wrist. An annular steam-chamber 26 is formed intermediate of these elements by the apposition of an internal annular groove in the sleeve and an external annular groove in the wrist, the bore of the rod 11 communicating directly with this chamber and communication between the wrist and chamber being effected by a transverse port 27 through the wall of the former. The wrist is thus enabled to revolve within the sleeve 25 without interrupting the communication between the interiors of the rod 11 and the wrist. The other piston-rods—that is to say, the rods 12 and 13—are formed with bearing-heads 28 and 29, fitting close against the exterior of the sleeve 25 and provided with elongated steam-cavities 30, communicating with the bores of the rods and located opposite ports 31 and 32 in the sleeve, establishing constant communication between the steam-chamber 26 and the steam-cavities 30. An enlargement 33 is formed at the base of the rod 11, and sufficient space is left between the heads and said enlargement to permit the requisite movement of the heads upon the sleeve as the rods 12 and 13 oscillate. The desired constant communication is thus maintained, as the cavities 30 are of such length that they will always remain in communication with the ports 31 and 32 during the sliding of the heads upon the sleeve. The heads are movably secured in place by clamping-rings 34 and 35, encircling the ends of the heads and sleeve, and backed by a backing-ring 36, rigid upon the wrist, and by the crank-wheel 37, keyed upon the inner extremity of the solid end 38 of the power-shaft. The wrist is preferably connected to this wheel by a reduced threaded end 39, passed through an aperture 40 in the wheel and upon which a nut 41 is screwed.

The motor as thus far described is substantially identical with the structure which has been made the subject-matter of the concurrent application already referred to; but we shall now proceed with a description of the novel forms and relations of the pistons and the outer or valve ends of the piston-rods and of the simple and ingenious reversing-gear for effecting instantaneous and simultaneous conversion or reversal of valve mechanism to drive or reverse the motor.

Each piston is, as usual, of general cylindrical form, fitting snugly within its cylinder, but is hollowed out from its inner end to form an internally-threaded circular recess 42, the end wall 43 of which is countersunk to produce a semispherical socket 44 for the reception of a spherical valve head or ball 45, 46, or 47, formed at the outer end of each piston-rod and pierced by the outer end of the supply port or bore of the rod. The circular valve-heads are each retained by a bearing-ring 48, externally threaded to engage the threads of the recess 42, into which it is screwed until its inner face contacts with the face of the head. These rings serve to retain the heads in contact with the semispherical sockets in the pistons and are made reversible to extend their terms of usefulness as bearing members by having two oppositely-disposed annular bearing-faces 49 and 50, whose transverse curvatures correspond to the curvature of a circular surface section or zone defined between parallel great and small circles of the spherical valve-head, the circumferential dimensions of these faces diminishing from the opposite ends of the rings to their middle, where the lesser edges of the faces intersect. Thus as the bearing-rings are screwed against the valve-heads the latter are retained snugly in position, but are permitted to have such universal movement within their sockets as will permit the necessary oscillations of the rods. When the motor is running forward, the steam passes into the cylinders from the supply-ports of the rods through the piston-ports 22, 23, and 24, after which at a proper point of the piston-stroke the oscillations of the piston-rods remove the supply-ports from coincidence with the piston-ports and present instead the forward exhaust-ports 51, one of which pierces each valve-head to one side of the supply in the line of the oscillatory movement and extending from the face of the head adjacent to the piston-port to the opposite face of the head adjacent to piston-rod. As the motor is operated the reciprocations of the pistons and the oscillations of the rods will cause the alternate presentation of the supply and exhaust ports before the piston-ports and will thereby effect alternately the supply of steam to the cylinders and its exhaust therefrom into the interior of the casing. The primary object of our present invention, however, is to provide simple, durable, and effective means for reversing a motor of this type at any point of the piston-stroke, and we shall now proceed to describe the mechanism we employ for accomplishing this result.

In each valve-head, at the side of the supply-port opposite the forward exhaust-port 51, we provide a reverse exhaust-port 52. Now by reversal of the pistons—that is to say, by turning them half-way around—we bring the eccentrically-located piston-ports into such relation to the reverse exhaust-ports 52 that the oscillations of the pistons will present the latter instead of the forward exhaust-ports 51, the result being the reversal of the motor, as the angular disposition of the rods to bring the reverse exhaust-ports into coincidence with the piston-ports is at the opposite side of the axial center of the piston from that assumed to present the forward exhaust-port. The reversal of the motor is thus effected by the reversal of the pistons. Upon the pressure-face of each piston is cast a raised lug 53, to which are connected the inner ends of piston-reversing shafts 54, passing through and beyond the cylinder-heads, which are provided with stuffing-boxes 55 to prevent steam or other motive fluid from escaping around the shafts. When the pistons are at the outer limits of their movements, the shafts 54 are extended beyond the cylinder-heads at least the distance of the piston-stroke, and at their outer ends are keyed spur-pinions 56. These pinions are opposed to and mesh with a series of radial racks 57, forming portions of a reversing-ring 58, which encircles the motor-casing provided with guides 59, in which the ring moves within limits defined by stops 60, located in the path of movement of one of the racks. As the reversing-ring is shifted in one direction or the other the racks, acting as gear-faces, will rotate the pinions and shafts to effect the simultaneous reversal of the several pistons, as the transverse extent of each rack is sufficient to permit this operation. The length of each rack is at least equal to the length of the piston-stroke, and its usefulness is therefore manifold, since it constitutes a bearing for the outer end of the reversing-shaft, guides the shaft in its longitudinal movement, retains the piston in its adjusted position to prevent accidental derangement of the ports, and, above all, it permits the reversal of the motor at any point of the piston-stroke. This then constitutes a complete embodiment of the invention, since the operator by grasping the reversing-ring or a handle carried thereby can control the operation of the motor; but inasmuch as the engine is designed particularly for use upon an automobile we prefer to arrange a simple ring-actuating device in a manner to permit the reversal of the motor by the manipulation of a reversing-lever located within easy reach of the occupant of the vehicle and somewhat removed from the motor. This device comprehends a gear-face 61, formed in the back or rear of one of the racks 57 and engaged by a pinion 62, carried by a shaft 63, to the upper end of which the reversing-lever 64 is secured.

We do not consider it necessary to enter into an exhaustive discussion of the operation of motor, since the construction, arrangement, and operation of those features constituting a part of the present invention have been clearly defined during the course of the preceding description. It will appear, however, that we have produced a compact, durable, and efficient motor in which the pistons themselves perform the functions of controlling-valves and which comprehends simple and ingenious means for effecting the reversal of the pistons; but while the construction shown and described appears to be practicable and preferable at this time we reserve the right to effect such variations of construction and arrangement as may be embraced within the scope of the appended claims.

Obviously the engine could be effectively put out of action—as, for instance, when the operator leaves the vehicle—by making a quarter-turn of the pistons to bring the piston-ports out of the range of movement of the ports in the valve-heads and then locking the reversing-gear in any suitable manner.

Therefore what we claim as new, and desire to secure by Letters Patent, is—

1. In a motor the combination with a cylinder and piston, of means for effecting the reversal of the motor through the movement of the piston upon its axis, and means for effecting such movement of the piston.

2. A motor comprising a cylinder, a piston provided with a port, a coöperating element provided with supply and exhaust ports, and means of moving the piston to effect a change of relation of the ports.

3. A motor comprising a cylinder, a piston provided with an eccentric port, means for regulating the supply and exhaust of steam to and from the cylinder through said port, and means for effecting rotary movement to reverse the position of the piston-port.

4. A motor comprising a cylinder a piston provided with an eccentric port, an oscillatory piston-rod connected to the piston and provided with a plurality of exhaust-ports and an intermediate supply-port and means for shifting the position of the piston to effect the exhaust through either of the exhaust-ports.

5. A motor comprising a plurality of cylinders, pistons provided with ports, and means for regulating the supply and exhaust of motive fluid to and from the cylinder through the piston-port and means for simultaneously shifting the positions of the pistons to effect the reversal of the motor.

6. A motor comprising a plurality of cylinders, a plurality of pistons provided with eccentric ports, piston-rods connected to the pistons and provided respectively with a plurality of exhaust-ports and an intermediate supply-port, and means for simultaneously shifting the pistons upon their axis to oppose the piston-ports to either of the exhaust-ports of piston-rods.

7. The combination with a cylinder, a piston provided with a port and means for effecting the supply and exhaust of motive fluid to and from the cylinder through the port, of a shaft operatively connected with the piston and means for rotating the shaft to shift the piston upon its axis.

8. In a motor the combination with a cylinder and piston, and means for effecting the reversal of the motor by the movement of the piston upon its axis, of a shaft extending axially from the piston, a pinion carried by said shaft and a movable rack engaging the pinion.

9. In a motor the combination with a cylinder, piston and means for effecting the reversal of the motor by the movement of the piston upon its axis, of a shaft extending axially from the piston, a pinion on said shaft, a transversely-movable rack engaging the pinion and of a length as great as the piston-stroke.

10. The combination with cylinder and a piston provided with a socket and an eccentric port, of a hollow piston-rod, a spherical valve-head upon the extremity of the rod and located within the socket of the piston, a pair of exhaust-ports piercing the head and means for shifting the piston upon its axis.

11. In a motor the combination with a casing, a plurality of radial cylinders therein, pistons within the cylinders and means for effecting the reversal of the motor by the movement of said pistons upon their axis, of a movable reversing-ring encircling the casing and means operatively connecting the reversing-ring with the several pistons to effect their simultaneous movement.

12. In a motor the combination with a casing, a plurality of radial cylinders therein, pistons within the cylinders, and means for effecting the reversal of the motor by the movement of said pistons upon their axis, of reversing-shafts extending axially from the pistons, pinions upon said shafts and a reversing-ring encircling the casing and provided with a plurality of racks engaging the pinions.

13. In a motor the combination with a casing, cylinders and pistons, of a reversing-ring encircling the casing and provided with a rack upon one face, means for operatively connecting the ring to the pistons, a pinion engaging the rack upon the ring and a reversing-lever operatively connected to said pinion.

14. A motor comprising a cylinder, steam supply and exhaust means, a piston capable of movement independent of the piston-rod to effect a reversal in the relation of the steam supply and exhaust, and means, exterior to the cylinder, for effecting an adjustment of the piston independent of its rod.

15. A motor comprising a cylinder, steam supply and exhaust means, and reversible piston coöperating with said supply and exhaust means.

16. A motor comprising a cylinder, a piston-rod, steam supply and exhaust means, a piston capable of movement independent of the piston-rod to effect a reversal in the relation of the steam supply and exhaust, and means for moving the piston independent of its rod.

17. A motor comprising a plurality of cylinders and ported pistons, reversing means associated with each piston, and an actuator exterior to the cylinders and common to the reversing means for all of the pistons to effect a synchronous adjustment thereof.

In testimony whereof we affix our signatures in presence of two witnesses.

CHARLES S. COLE.
WILLIAM J. BAULIEU.

Witnesses:
CHARLES H. SHANNON,
WILLIAM LOUNSBURY.